United States Patent Office 2,934,445
Patented Apr. 26, 1960

2,934,445

PAINTS BASED ON PORTLAND CEMENT

Kenneth Wilson Jones, Gravesend, Kent, and Peter Joseph Jackson, Swanscombe, Kent, England, assignors to The Associated Portland Cement Manufacturers Limited, London, England, a corporation of Great Britain No Drawing. Application September 6, 1957
Serial No. 682,283

Claims priority, application Great Britain October 10, 1956

3 Claims. (Cl. 106—95)

This invention relates to improvements in compositions based on Portland cement, for example paint compositions.

It is well known that various forms of Portland cement, which may be grey or white in colour, can be used as a base for certain types of paint. Such paints or paint compositions are usually supplied in dry powder form and when mixed with water produce liquid paints which can be applied to masonry, brick, concrete, asbestos-cement sheet and like surfaces to form a decorative and protective coating.

It is also well known that a measure of water repellency and increased resistance to passage of water can be imparted to such coatings by the presence of certain water repellent materials and it is common practice to include such water repellent materials as ingredients of the dry cement base paint compositions during manufacture.

However, such paint compositions have disadvantages which limit their ease of use. Thus the incorporation of water repellent materials in dry cement base paint compositions confers some degree of water repellency on them, which makes it difficult to mix them with water. When such water repellent paint powder is added to the water the particles do not disperse easily but tend to agglomerate and to remain incompletely wetted out and the mixtures of powder and water lack the smooth creamy consistency required in a paint. To facilitate the wetting of the water repellent paint powder it is a common practice to mix the powder and water in such proportions as will produce a thick paste. The work done in stirring this thick paste provides the energy required to overcome the water repellency of the powder particles and the paste then has to be stirred with a further amount of water to obtain a paint of suitable consistency.

While this method ensures that the majority of the paint powder particles are wetted out during formation of the paste it usually involves considerable effort in mixing the paste and diluting it to a paint consistency. It is also objectionable in that the powder and water have to be measured out in the correct predetermined proportions which will produce a suitable paste.

The present invention provides improved cement base paint compositions which have greatly improved miscibility with water and disperse readily when added to water in any proportions and with gentle stirring. Furthermore the water repellency of paint coatings produced from these new paint compositions is unimpaired.

The invention is based on the discovery that the ease of wetting and dispersion in water of dry cement base paint compositions containing water repellent materials is greatly improved by the addition to the dry powder of certain amines. The present invention comprises a cement base powder which is free running when in the dry state and which contains water repellent material, said powder also including an aliphatic primary monoamine containing from 6 to 10 carbon atoms per molecule, or a mixture of such amines, in a proportion sufficient to make the powder readily wettable and dispersible in water.

The dry cement base compositions used in making the new paints may be such as are now commonly used and consisting of Portland cement as the main ingredient mixed with relatively small amounts of hygroscopic salts, pigments, fillers and water repellent materials. It is common practice to employ calcium or sodium chloride as hygroscopic salts. Alkali resistant pigments such as iron oxides and chromium oxide are usually used to produce the desired colour and a proportion of titanium dioxide may be added to increase the hiding power and brightness of the paint coating. Proportions of whiting, hydrated lime, and sand may also sometimes be included in such paint compositions. The water repellent materials most frequently added are fatty acid soaps such as the stearates of calcium or aluminium but other water repellents such as silicones, fatty acid esters or long chain fatty acids may also be employed.

The primary amines which are used according to the invention may be either straight chain or branched chain amines, and as previously indicated mixtures of amines may be employed. It is convenient to employ commercial mixtures of amines which are readily available, for example the mixture of $C_6$ to $C_{10}$ amines known as "Armeen 8," "Armeen" being a registered trademark.

It is well known that the degree of water repellency acquired by a dry powder cement base paint composition depends not only on the type and amount of water repellent compounds used but on the degree of dispersion of such compounds in the dry powder composition, which will depend on the manner in which the ingredients of the composition are incorporated.

The amount of $C_6$ to $C_{10}$ amine or mixture of amines which is required to carry out the provisions of the invention will vary somewhat with the degree of water repellency conferred on the dry cement base composition by the water repellent compound used and the manner of its incorporation and also with the nature of the amine or amine mixture used. For the kinds of cement composition that have been examined, the range of 0.05% to 2.0% by weight of the amine based on the weight of the total solid constituents of the dry composition has been found suitable. In general amounts of amine or amine mixture of from 0.1% to 1.0% by weight of the dry cement base paint composition are preferred. If too much amine is used the paint composition may cease to be a free running powder and objectionable oily drops of amine may arise on the surface of the liquid paint. If too little amine is used the dry powder will not have the desirable properties of easy wetting and dispersion in water which it is the main object of the invention to provide.

The invention will be further illustrated by the following examples.

*Example 1*

A dry cement base paint composition is made from the following ingredients:

| | Parts by weight |
|---|---|
| White Portland cement | 90.0 |
| Whiting | 5.5 |
| Yellow ochre (iron oxide pigment) | 0.8 |
| Calcium stearate | 0.5 |
| Calcium chloride | 3.0 |
| "Armeen 8" (a commercial mixture of $C_6$ to $C_{10}$ amines) | 0.1–1.0 |

In making this composition the amine mixture and other ingredients are mixed together in a ball mill. Except for the amine mixture the composition of the above example is typical of cement base paint compositions such as have hitherto been used. When the resulting powder containing the amine mixture is slowly poured into water with gentle stirring, it wets out completely and disperses to form a creamy paint. Addition of powder can be stopped when a suitable paint-like consistency is attained. By contrast, a sample having the above composition but containing no amine does not wet out and disperse but forms a suspension of large unwetted flocs of powder in the water which is quite unsuitable for use as a paint. To obtain a liquid paint from this powder 2 volumes of powder must be measured out and added to 1 volume of water. The mixture has then to be stirred for several minutes until a paste is produced which then has to be gradually thinned down with more water to a paint-like consistency.

*Example 2*

A dry cement base paint composition is made with the following ingredients mixed together in a ball mill:

| | Parts by weight |
|---|---|
| White Portland cement | 83.0 |
| Aluminium stearate | 0.5 |
| Sodium chloride | 3.0 |
| Titanium dioxide | 4.0 |
| Fine silica sand | 10.0 |
| Mixture of $C_8$ to $C_{10}$ amines sold as "Armeen 8" | 0.1–1.0 |

This dry composition admixes well with water and shows the same properties and advantages referred to in Example 1.

Different kinds of Portland cement can be used in making the new paint compositions and the scope of the invention is not limited as to the nature, amount and method of incorporation of the water repellent compound nor as to the nature, amount and method of incorporation of other well-known constituents such as cement set promoters, extenders, pigments, or sand which it has hitherto been common practice to include in dry cement base paint compositions.

What is claimed is:

1. A dry and free-running paint composition consisting essentially of Portland cement, a water-repellent compound selected from the group consisting of stearic acid and esters and salts of stearic acid, and 0.05–2% by weight of an aliphatic primary mono-amine having 6–10 carbon atoms per molecule, including mixtures of such amines, the ratio of the proportions of amine and water-repellent material present being in the range of from 0.1–4.0

2. A dry and free-running composition according to claim 1, wherein the amine is present in an amount of from 0.1–1.0% by weight.

3. A dry and free-running composition according to claim 1, wherein the ratio of the proportions of amine and water-repellent material present is in the range of from 0.2–2.0.

References Cited in the file of this patent
UNITED STATES PATENTS

| 2,004,545 | Wolf et al. | June 11, 1935 |
| 2,305,113 | Scripture | Dec. 15, 1942 |
| 2,320,010 | Ralston et al. | May 25, 1943 |
| 2,644,771 | Kempthorne | July 7, 1953 |